United States Patent
Zosel et al.

(10) Patent No.: US 7,311,260 B2
(45) Date of Patent: Dec. 25, 2007

(54) CAMERA POSITIONING AND CONFIRMATION FEEDBACK SYSTEM

(75) Inventors: Andrew J. Zosel, Covington, WA (US); Danny S. Barnes, Maple Valley, WA (US); Matthew E. Allen, Maple Valley, WA (US)

(73) Assignee: Microscan Systems Incorporated, Renton, WA (US)

( * ) Notice: Subject to any disclaimer, the term of this patent is extended or adjusted under 35 U.S.C. 154(b) by 93 days.

(21) Appl. No.: 10/052,677

(22) Filed: Jan. 18, 2002

(65) Prior Publication Data

US 2003/0136842 A1    Jul. 24, 2003

(51) Int. Cl.
G02B 26/08    (2006.01)

(52) U.S. Cl. .................. 235/462.22; 235/462.32; 235/462.41; 235/462.11; 235/454

(58) Field of Classification Search ........... 235/462.22, 235/462.32, 462.41, 454, 462.11
See application file for complete search history.

(56) References Cited

U.S. PATENT DOCUMENTS

| | | | |
|---|---|---|---|
| 4,409,470 A | 10/1983 | Shepard | |
| 5,177,347 A * | 1/1993 | Wike, Jr. | 235/462.38 |
| 5,192,856 A | 3/1993 | Schaham | |
| 5,212,371 A * | 5/1993 | Boles et al. | 235/462.39 |
| 5,291,009 A | 3/1994 | Roustaei | |
| 5,349,172 A | 9/1994 | Roustaei | |
| 5,354,977 A | 10/1994 | Roustaei | |
| 5,484,994 A | 1/1996 | Roustaei | |
| 5,532,467 A | 7/1996 | Roustaei | |
| 5,581,071 A * | 12/1996 | Chen et al. | 235/462.06 |
| 5,598,007 A * | 1/1997 | Bunce et al. | 250/566 |
| 5,600,116 A | 2/1997 | Seo et al. | |
| 5,627,358 A | 5/1997 | Roustaei | |
| 5,702,059 A | 12/1997 | Chu et al. | |
| 5,756,981 A | 5/1998 | Roustaei | |

(Continued)

FOREIGN PATENT DOCUMENTS

EP    1 128 315 A1    8/2001

(Continued)

OTHER PUBLICATIONS

PCT International Search Report, May 30, 2003.

*Primary Examiner*—Michael G. Lee
*Assistant Examiner*—Allyson N Trail
(74) *Attorney, Agent, or Firm*—Blakely Sokoloff Taylor & Zafman LLP

(57) ABSTRACT

An apparatus is disclosed comprising a base capable of receiving a camera including a lens, and a projector coupled to the base and adapted to project a plurality of beams of light onto a plane positioned at a focus distance from the base, wherein the projections of the beams of light on the plane are geometric shapes, and wherein an intersection of the geometric shapes is at the center of the field of view of the lens when the lens is installed on the base. In addition, an apparatus is disclosed comprising a base capable of receiving a camera including a lens, an image processor capable of being coupled to the camera for processing an image of a target captured by the camera, and a confirmation projector coupled to the image processor, wherein the projector projects a confirmation beam onto the plane of the target when the image processor signals the confirmation projector that it has processed the image.

18 Claims, 6 Drawing Sheets

U.S. PATENT DOCUMENTS

| | | | |
|---|---|---|---|
| 5,992,751 A * | 11/1999 | Laser | 235/472.01 |
| 6,019,286 A | 2/2000 | Li et al. | |
| 6,060,722 A | 5/2000 | Havens et al. | |
| 6,065,678 A * | 5/2000 | Li et al. | 235/462.46 |
| 6,095,422 A * | 8/2000 | Ogami | 235/462.27 |
| 6,105,869 A | 8/2000 | Scharf et al. | |
| 6,330,521 B1 | 12/2001 | Hahn et al. | |
| 6,330,974 B1 * | 12/2001 | Ackley | 235/472.01 |
| 6,340,114 B1 * | 1/2002 | Correa et al. | 235/462.22 |
| 6,736,321 B2 * | 5/2004 | Tsikos et al. | 235/462.14 |
| 7,075,663 B2 | 7/2006 | Canini et al. | |

FOREIGN PATENT DOCUMENTS

| | | |
|---|---|---|
| EP | 1 172 756 A1 | 1/2002 |

* cited by examiner

CAMERA POSITIONING AND CONFIRMATION FEEDBACK SYSTEM

TECHNICAL FIELD

The present invention relates generally to data acquisition equipment, and in particular, but not exclusively, to a system to provide positioning and reading feedback to a user of a data acquisition device.

BACKGROUND

Data acquisition devices have become an important tool in tracking many different types of items. Perhaps the best-known and longest-used type of data acquisition device is the bar-code scanner, which is often used in commercial applications such as grocery stores to identify groceries, in document applications to track documents, and so forth. Bar code scanners typically read and decode a linear bar code, which can either be printed directly on an item of interest or can be printed on a label and then attached to the item. The most familiar type of linear bar code usually consists of a series of black bars of differing widths, spaced apart from each other by white space.

Less well known than linear bar code, but equally if not more important, are two-dimensional codes, also known as "matrix" codes. The two-dimensional code has several advantages over linear code, most important of which are the ability to encode much more information than a linear code, vastly improved data integrity, and occupy far less space. A disadvantage of two-dimensional codes is that they are more difficult to read and decode. Two-dimensional codes are usually read by machine vision systems, which essentially capture a digital image of the two-dimensional code, and then proceed to analyze that image to extract the information contained in the code. One chronic difficulty that has emerged in the reading of two-dimensional codes is that of ensuring that the machine vision scanner acquires an image of the code from which it can extract information. One of the difficulties in acquiring a suitable image is ensuring that the code itself is positioned within the field of view of the scanner, and that the image is in focus.

One approach to providing position and focus feedback to the user of scanner is described in U.S. Pat. No. 5,756,981 to Roustaei et al. Roustaei describes a scanner system including a targeting feature that uses several beams of light to indicate the positions of some of the boundaries of the system's field of view. Roustaei's system suffers from various disadvantages. Among other things, the system is limited to indicating only the positions of two of the boundaries of the field of view, or, alternatively, the positions of the four corners of the field of view. Roustaei provides no indication of where the center of the field of view lies. Since the center of the field of view is the optimal position for a target whose image is to be captured, Roustaei provides sub-optimal results because it forces the user to either guess or visually interpolate the center of the field of view. Moreover, Roustaei targeting feature only tells a user when the target is in the field of view, but does not provide any information to assist the user in positioning the target at the proper focus distance. Finally, Roustaei's targeting feature employs very complex optical components, such as lasers, fiber optics, beam splitters, and complex configurations of mirrors and lenses. The nature and complexity of the components involved leads to high costs and, inevitably, to poor system reliability.

Another related and chronic problem associated with machine vision scanning of two-dimensional codes is providing feedback to the user when the code has been successfully read. Current systems either provide an audible tone when a code is read, or contain one or more light-emitting diodes (LEDs) on the chassis of the scanner that light up when a code is successfully read. Both these approaches have disadvantages. If the audible tone is too loud, it quickly grows annoying to human operators, which could lead them to switch off the tone or ignore it altogether. If the tone's volume is reduced to make it less annoying to the operator, the operator may not be able to hear the tone in an environment with high levels of background noise. With the LED's on the chassis of the scanner, the user must continually look away from the code he or she is trying to scan to look at the LEDs to see if they light up. This is a distraction for the user, and takes their attention away from keeping the code within the field of view of the scanner.

SUMMARY OF THE INVENTION

An apparatus is disclosed comprising a base capable of receiving a camera including a lens, and a projector coupled to the base and adapted to project a plurality of beams of light onto a plane positioned at a focus distance from the base, wherein the projections of the beams of light on the plane are geometric shapes, and wherein an intersection of the geometric shapes is at the center of the field of view of the lens when the lens is installed on the base. Also disclosed is a process comprising projecting a first light beam onto a plane, wherein the projection of the first light beam on the plane is a first geometric shape, projecting a second light beam onto the plane, wherein the projection of the second light beam on the plane is a second geometric shape ar, and aligning the first and second beams such that an intersection of the first and second geometric shapes is at the center of the field of view of a lens of a camera, independently of the distance between the lens and the plane. In addition, an apparatus is disclosed comprising a base capable of receiving a camera including a lens, an image processor capable of being coupled to the camera for processing an image of a target captured by the camera, and a confirmation projector coupled to the image processor, wherein the projector projects a confirmation beam onto the plane of the target when the image processor signals the confirmation projector that it has processed the image. Additionally, a process is disclosed for capturing an image of a target on a plane using a camera, processing the image captured by the camera using an image processor, and projecting a confirmation beam onto the plane when the image processor signals to the confirmation projector that it has processed the image.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

Embodiments of a system and method for providing positioning and scanning feedback to the user of a machine-vision system are described herein. In the following description, numerous specific details are described to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in this specification do not necessarily all refer to the same embodiment. Furthermore, the particular features, structures, or characteristics may be combined in any suitable manner in one or more embodiments.

Figure 1:
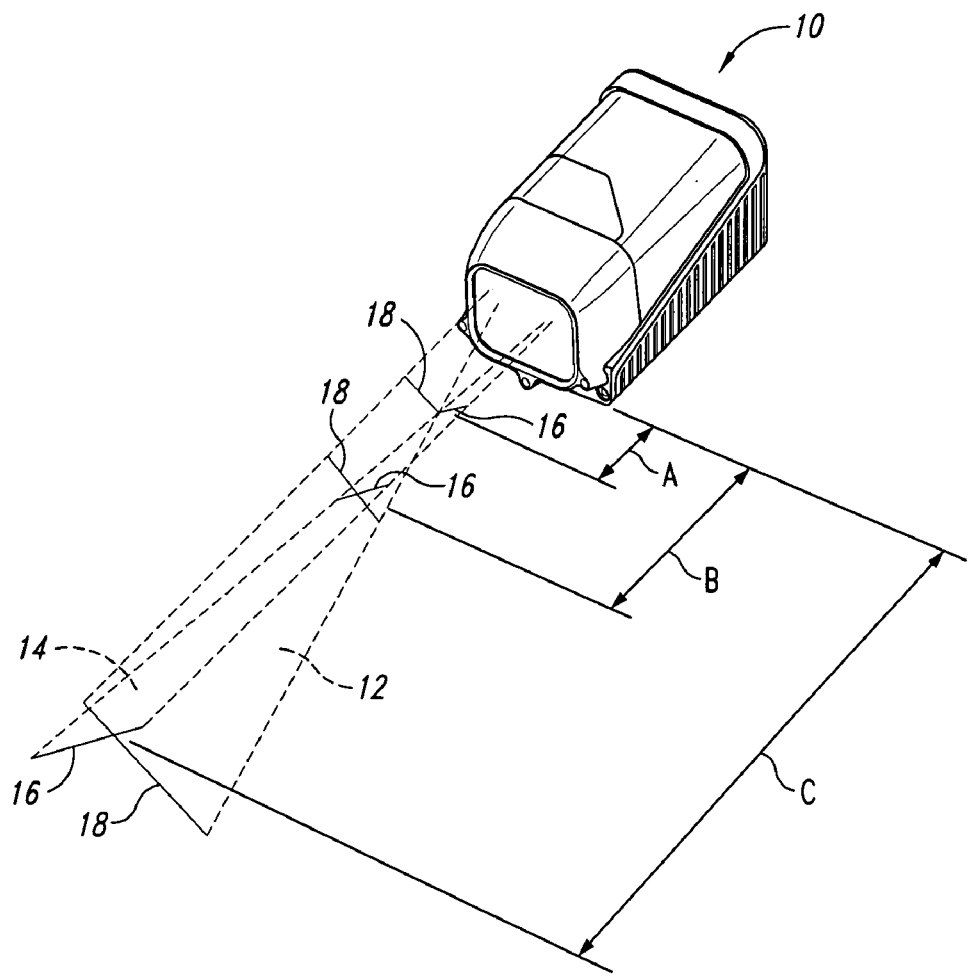
FIG. 1 is a perspective view illustrating the operation of an embodiment of the invention.

FIG. 1 illustrates the operation of an embodiment of the invention comprising a machine vision system 10. A machine vision system 10 generally includes a camera having optics designed to capture target images (or "targets") to be analyzed, such as two-dimensional bar codes, also known as "matrix" codes. Two-dimensional bar codes are only one example of a target whose image is analyzed using machine vision; other types of targets may also be analyzed. Generally, the optics are selected based on the physical size of the image to be captured, as well as the distance the system 10 will be placed from the image. If a small image far from the system 10 is to be captured, then optics having a long focal length and small field of view will be used; conversely, if a large image close to the system 10 is to be captured, optics having a shorter focal length and larger field of view will be used. Whether the system 10 reads labels at distances A, B, or C depends on the optics inside the system 10.

To allow a user of the system 10 to easily align the field of view of the optics with the image that is to be captured, the system 10 projects a first light beam 12 and a second light beam 14 toward a plane on which the image is located. Both light beams 12 and 14 are shaped to emerge from the system 10 as "flat" beams, such that the projection of each beam on a plane will be in a shape of a bar. Both beams 12 and 14 are aligned such that the bars 16 and 18 created by their projection on a plane will intersect each other. The beams 12 and 14 are aligned such that the intersection of the bars will be in the center of the field of view of the optics within the system 10, regardless of distance from the system. In other words, whether the image to be scanned is at distance A, B, or C from the system 10, the intersection of the bars will indicate the center of the field of view of the optics within the system. Thus, if the user places the image to be read by the system at the intersection of the bars, the image will be properly positioned to be read by the system.

As further explained below, the exact nature of the intersection will depend on the distance between the system 10 and the plane on which the bars are projected. Thus, at a first distance A the bars 16 and 18 form a "V" shape, at a second distance B the bars 16 and 18 form an "X" shape, and at a third distance C the bars 16 and 18 form a caret ("^"). The shape of the intersection of the bars 16 and 18, thus also gives a user setting up the system 10 feedback regarding the proper focus distance for the image. Thus, using the combination of the intersection of the bars and the shape formed by intersection of the bars, a user can easily position the image to be scanned in the field of view at the proper distance to obtain the optimum focus, so that the camera within the system 10 can obtain a sharp image.

Figure 2A:
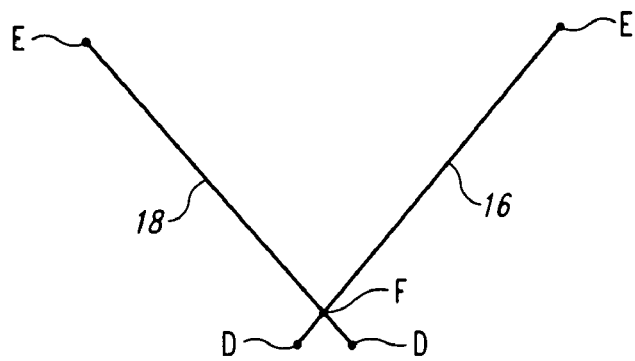
FIGS. 2A-2C are drawings illustrating the variation of the shape of the intersection of the bars with focus distance from the plane.
Figure 2B:
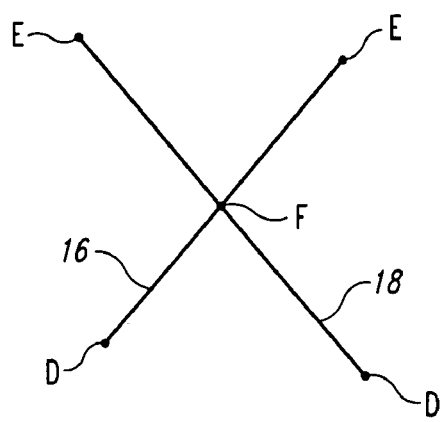
Figure 2C:
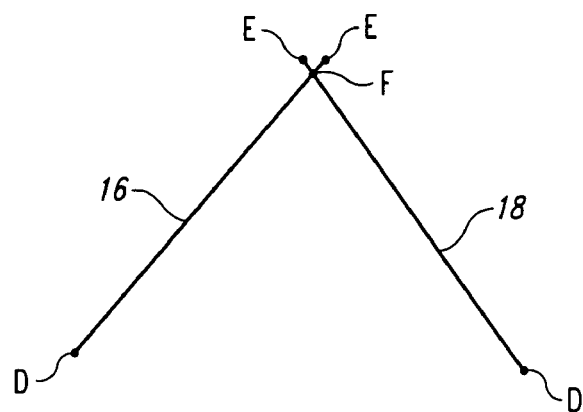

FIGS. 2A-2C illustrate one possible embodiment of the relationship between the shape formed by the intersection of the bars 16 and 18 and the focus distance (A, B or C) between the system 10 and the plane. In other embodiments, different geometric shapes besides bars could also be used, instead of or in addition to the bars, to convey the same field-of-view and focus information. For example, polygonal shapes such as squares and triangles could be used, as well as shapes such as circles, etc. Each bar 16 and 18 has a first end E and a second end D. The bars intersect at point F, which, as explained above, always corresponds to the center of the field of vision of the optics in the system, independent of the distance between the system 10 and the plane.

Figure 3:
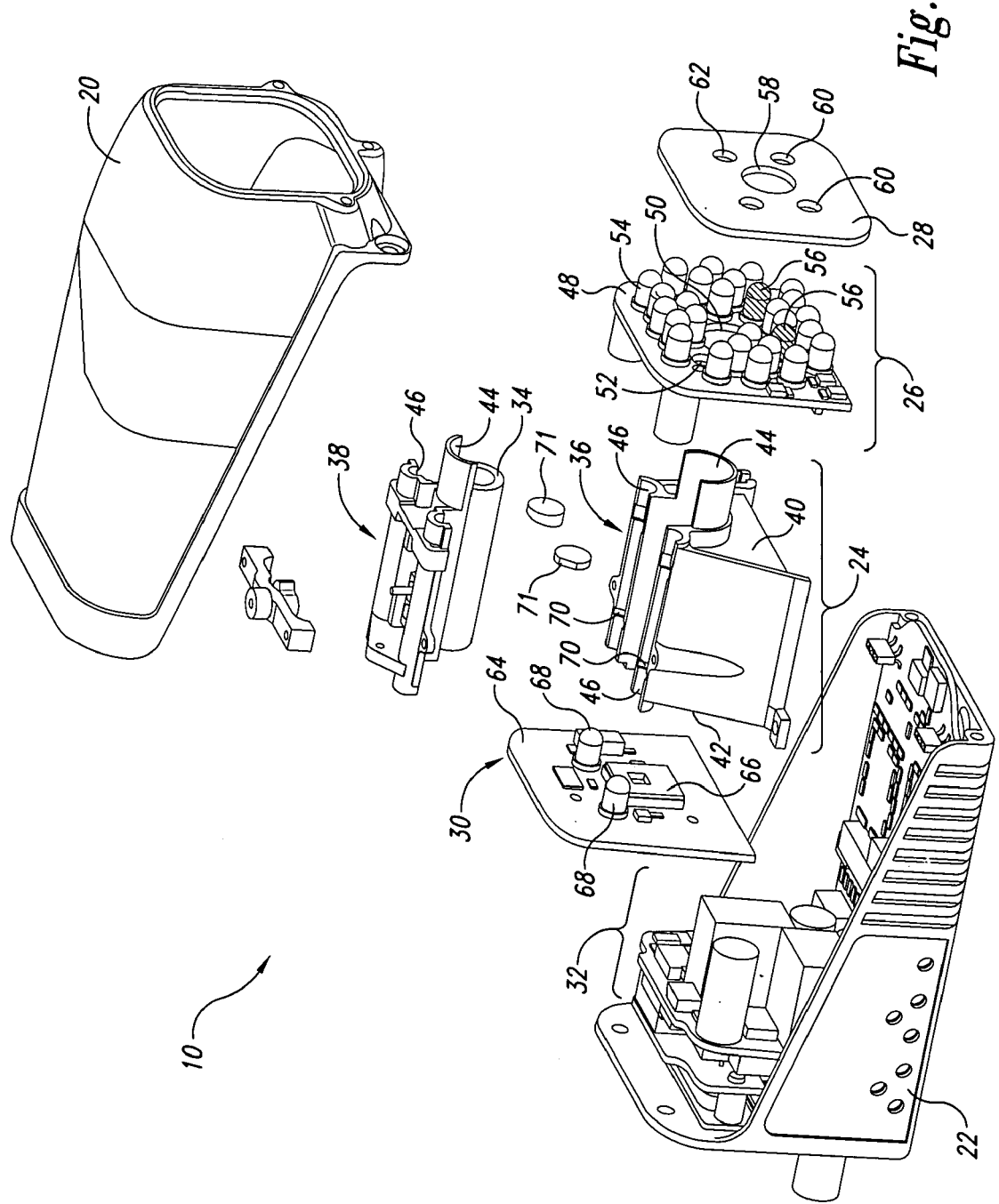
FIG. 3 is an exploded perspective view illustrating the components of an embodiment of the present invention.

In FIG. 2C, the first bar 16 and second bar 18 intersect at or near their first ends E, thus substantially taking the shape of a caret ("^"). When the bars intersect in the caret shape shown, the user knows that the plane on which the bars are projected is a distance C from the system, and that the point F is at the center of the view of the lens within the system. Thus, if the optics are such that the focus distance is distance C, the user simply adjusts the distance from the system 10 such that the caret-shaped intersection is created, and then positions the image to be captured at or near the intersection F. FIG. 2B illustrates the intersection of the bars 16 and 18 when the plane on which they are projected is a distance B from the system. In this case, the bars 16 and 18 intersect substantially in an "X" shape, with the point of intersection F again being the center of the field of view of the optics. The bars 16 and 18 intersect so as to substantially bisect each other; in other words, each bar roughly cuts the other in half. Again, if the optics within the system 10 are such that B is the correct focus distance, a user adjusts the distance from the system until the X shape is formed and positions the image at point F. The image is at the proper distance and in the proper location for scanning by the system. FIG. 2A illustrates the pattern formed by the bars at a focus distance A from the system 10. In this case, the bars 16 and 18 intersect each other at or near their second ends D, thus substantially forming a "V" shape. As before, if the optics within the system are such that A is the proper focus distance, a user simply adjusts the distance from the system 10 to the plane until the "V" shape is formed, and then positions the image at or near the point F. The image is then properly positioned and in focus for capture by the optics. FIG. 3 illustrates an embodiment of the internal construction of a machine-vision system 10. The system 10 includes a housing comprising an upper half of the housing 20 and a lower half of the housing 22. Contained within the housing are the main or primary components of the system: a base 24 which primarily holds and aligns the optics and other components, an illumination system 26, a front window 28, and an image sensing system 30. Also included within the system 10 are other components 32, which handle functions such as digital signal processing (DSP), input/output (I/O), and the like.

The primary function of the base 24 is to support and align the components of the system 10, including the optics 34 (e.g., lenses, apertures, and the like). The base 24 comprises a lower portion 36 and an upper portion 38, and has a front 40 and a rear 42. When the base is in its assembled state with the upper portion mounted on the lower portion 36, the base includes a tubular cavity 44 designed to support and align the optics 34 used by the system. The optics 34 reside within the tubular cavity 44 and focus the image to be captured on the image sensor 66 on the image sensing system 30 (see below). In addition to the central tubular cavity 44, two relatively smaller tubular cavities 46 are formed when the upper portion 38 is mounted on the lower portion 36. A light-emitting diode (LED) 68 is inserted into the rear of each tubular cavity 46, and a beam-forming apparatus is also mounted in each of the tubular cavities 46. The beam forming apparatus comprises a slit 70 mounted near the rear of the cavity 46 to form the light beam into a flat beam, coupled with a lens 71 mounted near the front of the cavity 46. The lens 71 is designed to collimate the light emerging from the slit, so that it projects from the system 10. In operation, when the LEDs 68 are illuminated light beams travel from the rear end of each cavity 46 through the cavity, through the slit 70, through the lens 71, then through the hole 52 in the illumination board, and out through the front window and on to the plane on to which they are projected.

The illumination system 26, as its name implies, provides illumination for the target, so that an image of the target can be captured by the image sensor 66. The illumination system 26 is mounted on the front 40 of the base 24. The illumination system 26 comprises a circuit board 48 having a central hole 50 therein, designed to coincide with the central cavity 44 of the base, when the illumination system 26 is mounted on the front of the base. In addition, there is a pair holes 52 in the circuit board 48 designed to coincide with the front ends of the tubular cavities 46 through which the light from the LEDs 68 passes. The purpose of the holes 50 and 52 is to allow the light to pass through the illumination system, out the front window 28, and onto the image to be captured.

Surrounding the central hole 50 on the circuit board 48 are a plurality of illumination LEDs 54. In this embodiment, the illumination LEDs 54 are red, although other colors may be used in other embodiments, and in other embodiments light sources besides LEDs may be used for illumination. In addition to the illumination LEDs 54, the illumination system includes two confirmation LEDs 56, which in this embodiment are green. The confirmation LED's are operatively connected to a signal processing unit; when the signal processing unit indicates that a code has been successfully decoded, both confirmation LEDs blink.

The primary purpose of the front window 28, in addition to closing and sealing the interior of the system 10, is to diffuse the light emitted by all of the illumination LEDs 54 on the circuit board 48 so that they uniformly illuminate the area where the target will be positioned. The front window 28 comprises a substantially flat piece of a material such as of glass or plastic with a coating applied thereto to protect it from scratching and abrasion. Most of the front window 28 is frosted to achieve the diffusion, although the diffusion may also be achieved by, for example, using a plurality of Fresnel lenses ground into a plastic or glass that comprises the front window.

Several areas of the front window 28 are not frosted. A central area 58 of the front window is designed to coincide with the hole 50 on the circuit board 48. This central area is transparent to allow light to travel through the front window and the central hole 50, and into the optics 34 contained in the tubular cavity 44 of the base. Thus, the central transparent area 58 in the front window 28 is to allow light to travel without dispersion or dissipation all the way to the image sensor module 30. The front window 28 also includes two transparent areas 62 which coincide with the holes 52 in the circuit board 48. The transparent areas 62 allow the beams formed by the LEDs 68 in conjunction with the slit 70 and lens 71 to pass through the front window for protection onto the target plane. Additionally, there are two small transparent areas 60 on the front window 28 whose position is designed to coincide with the position of the confirmation LEDs 56. These transparent areas allow the light emitted by the confirmation LEDs 56 to emerge through the front window and be projected directly onto the plane without any diffusion. In some embodiments, the transparent areas 58, 60 and 62 may also be shaped such that they refract light to provide further focusing, collimation, or shaping of light traveling through the front window 28.

The image sensing module 30 comprises a circuit board 64 on which is mounted an image sensor 66. The image sensor 66 may be any kind of commercially available sensor, such as a complementary metal oxide semiconductor (CMOS) chip, a charge coupled device (CCD), and the like. Also attached to the printed circuit board 64 are a pair of light emitting diodes (LEDs) 68. The LEDs 68 are the light sources used to create the beams 12 and 14, which then create the bars 16 and 18 when projected on a plane. In a preferred embodiment, the LEDs 68 emit red light, although other colors are possible. Moreover, although LEDs are used as light sources in this particular embodiment, other types of light sources suitable for use in forming the beams 12 and 14 can also be used. Additionally, although in this embodiment the LEDs 68 are positioned on the same circuit board 64 with the image sensor, they may instead be positioned elsewhere within the system 10.

Figure 4:
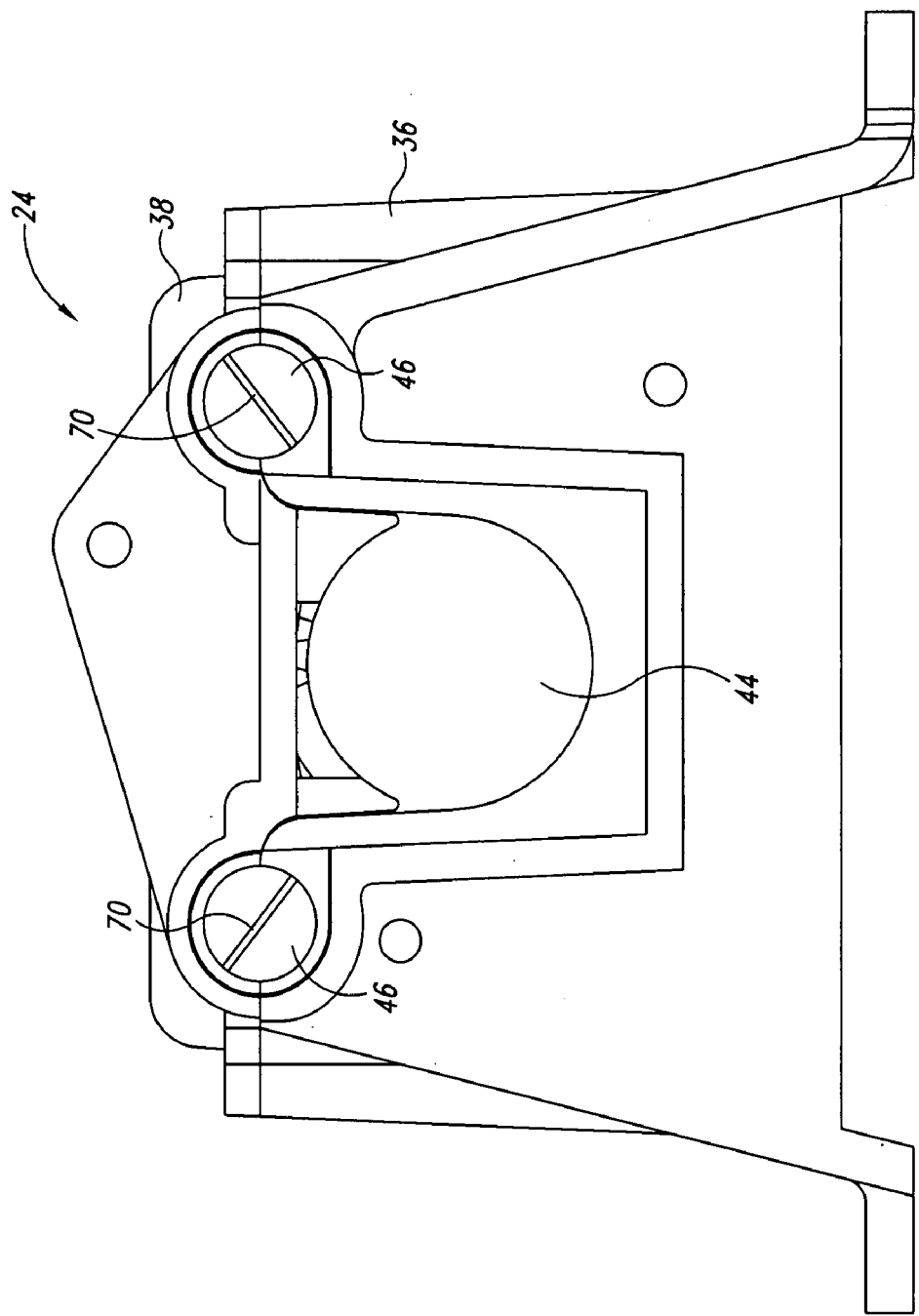
FIG. 4 is a frontal elevation view of the base component illustrated in FIG. 2.

FIG. 4 is a frontal elevation of the base 24, in its assembled condition with the upper portion 38 attached to the lower portion 36. Once the upper portion 38 is attached to the lower portion 36, a central cavity 44 is formed. As explained above, the purpose of this central cavity is to support and align the optics, which will be used to capture an image of the target and focus it on the image sensing module 30. In addition, two smaller cavities 46 are formed when the upper half is attached to the lower half. As explained above, the rear ends of the cavities 46 have slits 70 therein which are used to form the light emitted by the LEDs 68 into a flat shape, and the front ends of the cavities 46 contain lenses used to focus or collimate the light emitted from the slits.

Figure 5:
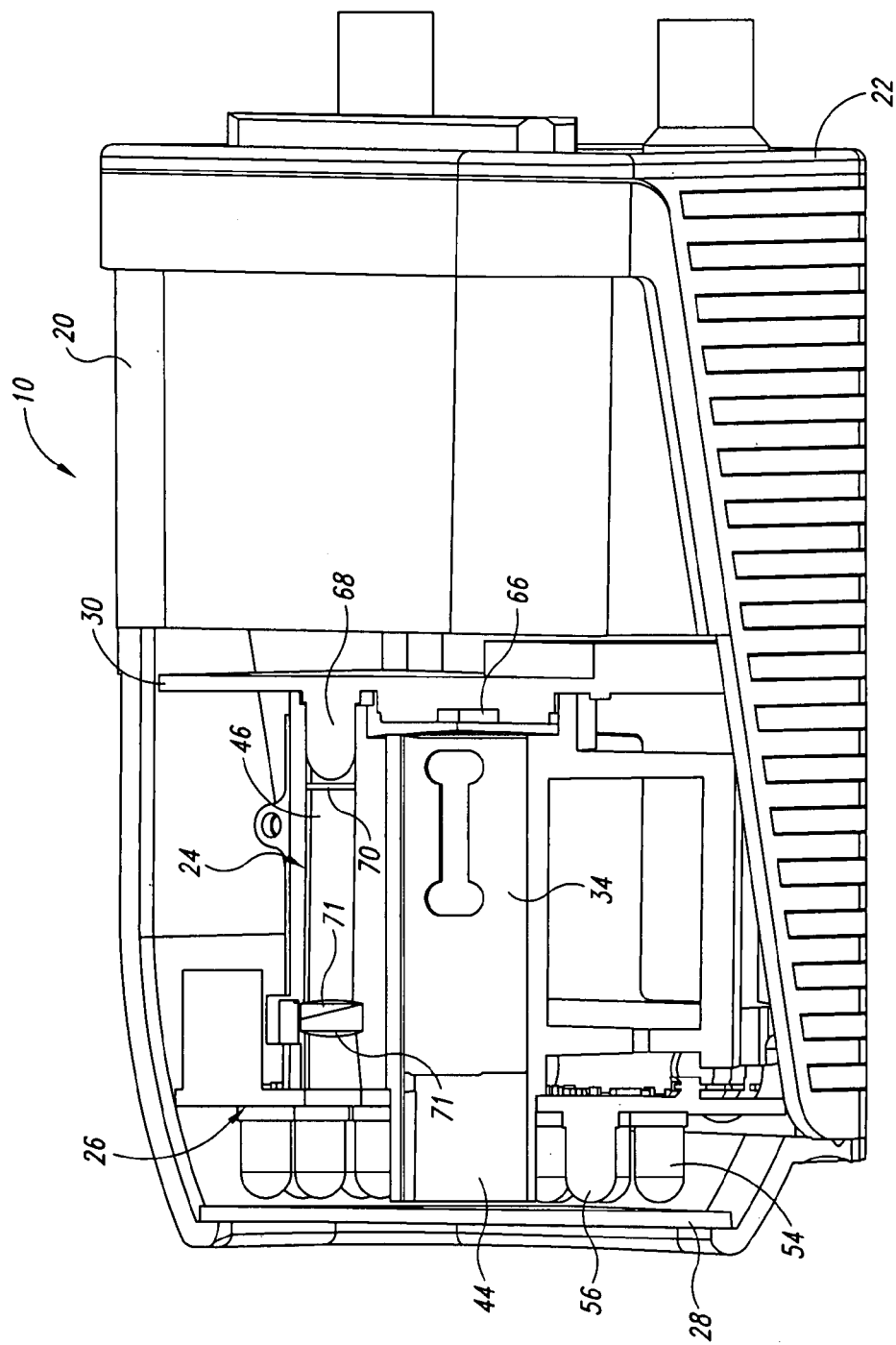
FIG. 5 is a side elevation illustrating the assembled state of the components of the invention illustrated in FIG. 3.

FIG. 5 is a side elevation of the system 10, illustrating its assembled state. The base 24 is attached to the lower half of the housing 22 by some fastening means such as screws, clips, etc. The image sensing module 30 is mounted onto the rear of the base 24, such that each of the LEDs 68 is inserted into the rear of one of the small tubular cavities 46. In this way, the light emitted by the LED 68 is channeled through the tubular cavity to the slit 70, then through the lens 71, then through a hole in the illumination system 26, and finally out through the front window 28. The image sensing module 30 is also mounted to the back of the base such that the image sensor 66 is aligned with the center of the tubular cavity 44 of the base. As explained above, the tubular cavity 44 supports and aligns the optics which focus the image onto the image sensor 66 for capture.

The illumination system 26 is attached to the front of the base 24, so that the light from the illumination LEDs 54 can be projected out through the front window and onto the target to be captured. The front window 28 is positioned at the very front of the unit 10 so it can diffuse the red light emitted by the LEDs 54 and provide uniform illumination of the target. As explained above, the front window has transparent portions to allow the light transmitted from the LED 68 through the smaller tubular cavities 46 to be transmitted onto the target, and also to allow the light from the target to pass unimpeded through the front window 28 and the optics 34, and onto the image sensor 66.

Figure 6:
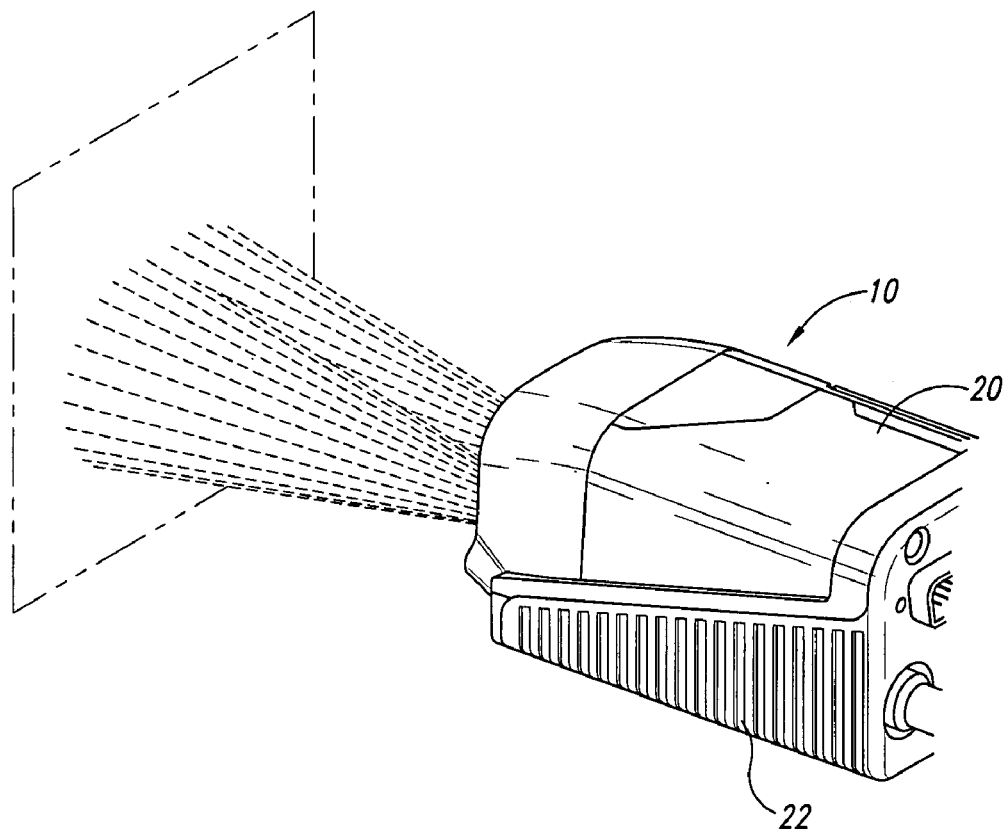
FIG. 6 is a perspective view illustrating the operation of the confirmation beam feature of the embodiment of the invention.

FIG. 6 illustrates the operation of the image processing confirmation described above. The confirmation LEDs 56 located on the illumination system 26 are coupled to the image processing electronics 32. After an image is captured using the image sensor 66, it is processed by digital signal processing (DSP) hardware. If the DSP hardware successfully decodes the image, it sends a signal to the two confirmation LEDs 56. In response to this signal, the confirmation LEDs 56 flash, thus projecting a quick burst of green light onto the plane containing the target and providing feedback to the user that a successful read was accomplished. In this way, the user does not have to take his or her eyes away from the field or the image to know whether a successful read was accomplished, but instead he or she waits for the green flash, which indicates a successful decoding of the label.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

The invention claimed is:

1. An apparatus comprising:
a base capable of receiving a camera including an image capture lens; and
a projector coupled to the base and adapted to project a plurality of beams of light onto a plane positioned at a focus distance from the base, wherein the projections of the plurality of beams of light on the plane are bars, and wherein an intersection of the bars is at the center of the field of view of the image capture lens independent of the distance between the image capture lens and the plane when the image capture lens is installed on the base.

2. The apparatus of claim 1 wherein the plurality of bars comprises two bars, including a first bar and a second bar.

3. The apparatus of claim 2 wherein a shape created by the intersection of the first and second bars varies according to the focus distance.

4. The apparatus of claim 3 wherein each of the first and second bars have first and second ends, and wherein
if the first and second bars intersect at or near both their first ends, substantially forming a caret shape, the camera is at a first focus distance;
if the first and second bars intersect each other, the camera is at a second focus distance; and
if the first and second bars intersect each other at or near both their second ends, substantially forming a V shape, the camera is at a third focus distance.

5. The apparatus of claim 1, further comprising the camera.

6. The apparatus of claim 1, further comprising:
an image processor for processing an image captured by the camera; and
a confirmation projector coupled to the image processor, wherein the projector projects a confirmation beam onto the plane when the image processor signals to the confirmation projector that the image processor has processed the image.

7. The apparatus of claim 6 wherein the confirmation beam flashes instantaneously onto the plane.

8. An apparatus comprising:
a base capable of receiving a camera including an image capture lens; and
first and second projectors, each comprising:
a light source,
a beam former positioned between the light source and the plane for forming the beam emitted from the light source, and
a lens for focusing the light beam emitted from the beam former;
wherein the first and second projectors are coupled to the base and adapted to project a plurality of beams of light onto a plane positioned at a focus distance from the base, wherein the projections of the plurality of beams of light on the plane are geometric shapes, and wherein an intersection of the geometric shapes is at the center of the field of view of the image capture lens independent of the distance between the image capture lens and the plane when the image capture lens is installed on the base.

9. A process comprising:
projecting a first light beam onto a plane, wherein the projection of the first light beam on the plane is a first bar;
projecting a second light beam onto the plane, wherein the projection of the second light beam on the plane is a second bar; and
aligning the first and second beams such that an intersection of the first and second bars is at the center of the field of view of an image capture lens of a camera independently of the distance between the image capture lens and the plane, wherein a shape created by the intersection of the first and second bars varies according to the focus distance.

10. The process of claim 9 wherein each of the first and second bars have first and second ends, and wherein:
if the first and second bars intersect at or near both their first ends, substantially forming a caret shape, the lens is at a first focus distance from the plane;
if the first and second bars bisect each other, the lens is at a second focus distance from the plane; and
if the first and second bars intersect each other at or near both their second ends, substantially forming a V shape, the lens is at a third focus distance from the plane.

11. The process of claim 9, further comprising:
capturing an image using the camera;
processing the image captured by the camera using an image processor; and
projecting a confirmation beam onto the plane when the image processor signals to the confirmation projector that it has processed the image.

12. A process comprising:
projecting a first light beam onto a plane, wherein the projection of the first light beam on the plane is a first geometric shape;
projecting a second light beam onto the plane, wherein the projection of the second light beam on the plane is a second geometric shape, and wherein projecting each of the first and second light beams comprises:
emitting light from a light source,
forming the beam emitted from the light source using a beam former positioned between the light source and the plane, and
focusing the light beam emitted from the beam former; and
aligning the first and second beams such that an intersection of the first and second geometric shapes is at the center of the field of view of an image capture lens of a camera, independently of the distance between the image capture lens and the plane.

13. An apparatus comprising:
a base capable of receiving an image processor and a camera including an image capture lens;
a projector coupled to the base and adapted to project a plurality of beams of light onto a plane positioned at a focus distance from the lens, wherein the projections of the beams of light on the plane are first and second bars, and wherein an intersection of the first and second bars is at the center of the field of view of the image capture lens independent of distance between the image capture lens and the plane when the image capture lens is installed on the base; and
a confirmation projector coupled to the image processor, wherein the projector projects a confirmation beam onto the plane when the image processor signals the confirmation projector that the image processor has processed the image.

14. The apparatus of claim 13 wherein the relative positions of the intersection of the first and second bars varies according to the focus distance.

15. The apparatus of claim 13 wherein each of the first and second bars have first and second ends, and wherein
if the first and second bars intersect at or near both their first ends, substantially forming a caret shape, the camera is at a first focus distance;
if the first and second bars bisect each other, the camera is at a second focus distance; and
if the first and second bars intersect each other at or near both their second ends, substantially forming a V shape, the camera is at a third focus distance.

16. The apparatus of claim 13 wherein the confirmation projector comprises:
a light source; and
a lens for focusing the light emitted from the light source.

17. The apparatus of claim 13 wherein the confirmation beam flashes instantaneously onto the plane.

18. An apparatus comprising:
a base capable of receiving an image processor and a camera including an image capture lens;
first and second projectors coupled to the base, each comprising:
a light source,
a beam former positioned between the light source and the plane for forming the beam emitted from the light source, and
a lens for focusing the light beam emitted from the beam former;
wherein the first and second projectors are adapted to project a plurality of beams of light onto a plane positioned at a focus distance from the lens, wherein the projections of the beams of light on the plane are geometric shapes, and wherein an intersection of the geometric shapes is at the center of the field of view of the image capture lens independent of distance between the image capture lens and the plane when the image capture lens is installed on the base; and
a confirmation projector coupled to the image processor, wherein the projector projects a confirmation beam onto the plane when the image processor signals the confirmation projector that the image processor has processed the image.

* * * * *

UNITED STATES PATENT AND TRADEMARK OFFICE
CERTIFICATE OF CORRECTION

PATENT NO. : 7,311,260 B2
APPLICATION NO. : 10/052677
DATED : December 25, 2007
INVENTOR(S) : Zosel et al.

It is certified that error appears in the above-identified patent and that said Letters Patent is hereby corrected as shown below:

On the Title Page
In Item [56], under refer Reference Cited, patent document 5,532,467, please delete "7/1996" and insert -- 6/1996 --.

Signed and Sealed this

Thirteenth Day of May, 2008

JON W. DUDAS
*Director of the United States Patent and Trademark Office*